United States Patent [19]
Love et al.

[11] Patent Number: 5,940,430
[45] Date of Patent: Aug. 17, 1999

[54] METHOD AND APPARATUS FOR POWER CONTROL IN A COMMUNICATION SYSTEM

[75] Inventors: Robert T. Love, Barrington; Kenneth A. Stewart, Chicago; William R. Bayer, Palatine, all of Ill.

[73] Assignee: Motorola, Inc., Schaumburg, Ill.

[21] Appl. No.: 08/971,976

[22] Filed: Nov. 17, 1997

Related U.S. Application Data

[62] Division of application No. 08/616,542, Mar. 15, 1996, Pat. No. 5,745,520.

[51] Int. Cl.$^6$ ........................................................ H04B 1/69
[52] U.S. Cl. ............................. 375/200; 455/442; 455/522; 370/332
[58] Field of Search ................................... 375/200, 206; 370/331, 332, 333, 335, 342, 441, 479; 455/422, 423, 424, 425, 436, 438, 439, 442, 517, 522, 524, 525, 69, 70, 550, 561

[56] References Cited

U.S. PATENT DOCUMENTS

| 5,216,692 | 6/1993 | Ling ........................................ 375/200 |
| 5,245,629 | 9/1993 | Hall ......................................... 375/200 |
| 5,267,262 | 11/1993 | Wheatley, III ........................... 375/200 |
| 5,333,175 | 7/1994 | Ariyavisitakul et al. ............... 455/423 |
| 5,386,589 | 1/1995 | Kanai ...................................... 455/423 |
| 5,396,516 | 3/1995 | Padovani et al. ....................... 370/342 |
| 5,430,889 | 7/1995 | Hulbert et al. .......................... 455/422 |
| 5,475,861 | 12/1995 | Hall ......................................... 370/342 |
| 5,574,983 | 11/1996 | Douzono et al. ........................ 455/69 |
| 5,623,484 | 4/1997 | Muszynski ............................... 370/335 |
| 5,625,876 | 4/1997 | Gilhousen et al. ...................... 370/331 |
| 5,652,748 | 7/1997 | Jolma et al. ............................. 370/320 |

OTHER PUBLICATIONS

IS–95, TIA/EIA, pp. 7–12/7–15.

*Primary Examiner*—Don N. Vo
*Attorney, Agent, or Firm*—Kenneth A. Haas

[57] ABSTRACT

Power control in a spread-spectrum communication system takes place by receiving a signal from a remote unit (713) at both a first (701) and a second (707) base station and combining the two received signals to form a single combined signal. The power of the remote unit (713) is adjusted based on the single combined signal.

3 Claims, 5 Drawing Sheets

METHOD AND APPARATUS FOR POWER CONTROL IN A COMMUNICATION SYSTEM

This is a division of application Ser. No. 08/616,542, filed on Mar. 15, 1996, now U.S. Pat. No. 5,745,520.

FIELD OF THE INVENTION

The present invention relates generally to spread-spectrum communication systems and, in particular, to power control in a spread-spectrum communication system.

RELATED INVENTIONS

The present invention is related to "Method and Apparatus for Power Control in a Communication System" (Attorney Docket No. CE02979R), having Ser. No. 08/616,797 filed on Mar. 15, 1996 which is now U.S. Pat. No. 5,778,030 and assigned to the assignee of the present invention.

BACKGROUND OF THE INVENTION

Communication systems are known to employ power control methods which control transmission energy of remote units. Once such communication system employing power control is a spread-spectrum communication system. Power control in a spread-spectrum system serves two main functions. Firstly, because each remote unit's signal in a spread-spectrum system is typically transmitted on the same frequency, a majority of the noise (which is inversely proportional to bit energy per noise density i.e., $E_b N_0$ which is defined as the ratio of energy per information-bit to noise-spectral density), associated with a received signal can be attributed to other remote units' transmissions. The magnitude of noise is directly related to the received signal power of each of the other remote units' transmissions. Thus it is beneficial for a remote unit to transmit at the lowest power level possible. Secondly, it is desirable to dynamically adjust the power of all remote units in such a way that their transmissions are received by the base station with approximately the same power level. To accomplish this, it is necessary for the closest transmitters to reduce their power by as much as 80 dB when compared to the power of the furthest transmitters.

The current method of controlling reverse channel power in a code-division, multiple-access (CDMA) communication system is described in Cellular System Remote Units-Base Station Compatibility Standard of the Electronic Industry Association/Telecommunications Industry Association Interim Standard 95 (TIA/EIA/IS-95A), which is incorporated by reference herein. (EIA/TIA can be contacted at 2001 Pennsylvania Ave. NW Washington D.C. 20006). As described in TIA/EIA/IS-95A, a power-control group is transmitted from the remote unit and received by the base station. The base station compares the energy of the power-control group to a threshold and instructs the remote unit to power up or down accordingly by transmitting a power-adjustment command to the remote unit. While this algorithm does insure that the threshold level does not contribute to long runs of frame errors where the remote unit is not transmitting at a high enough power level, the power level of the remote unit can be higher than necessary for lengthy periods of time, needlessly contributing to system noise.

Thus a need exists to reduce noise in a CDMA system by dynamically adjusting the step-down size of the power-control threshold.

DESCRIPTION OF A PREFERRED EMBODIMENT

The present invention addresses the above-mentioned problem by dynamically adjusting the step-down size of a power control threshold based on an acquired number of poor-quality frames. The step-down size of the threshold is increased or decreased depending on an amount of frame erasures detected by the system.

Generally, the present invention encompasses a method for power control in a communication system comprising adjusting a step-down size of a threshold.

Another aspect of the present invention encompasses a method of power control in a spread-spectrum communication system comprising, receiving a plurality frames and storing the plurality of frames. An amount of poor-quality frames existing within the stored plurality of frames is determined, and a step-down size of a threshold is made, based on the determination.

Another aspect of the present invention encompasses a method of power control in a spread-spectrum communication system, comprising the steps of receiving a full-rate frame and receiving a sub-rate frame. An amount of full-rate and sub-rate poor quality frames are determined and a step-down size of a threshold is determined based on the determined amount.

Another aspect of the present invention encompasses an apparatus for power control in a spread-spectrum communication system, the apparatus comprising an integrator for adjusting a step-down size of a threshold.

Another aspect of the present invention encompasses an apparatus for power control in a spread-spectrum communication system, the apparatus comprising a receiver for receiving a plurality of frames, a filter coupled to the receiver, said filter storing the plurality of frames, a comparator coupled to the filter, said comparator determining an amount of poor-quality frames existing within the plurality of stored frame attributes, and an integrator coupled to the comparator, the integrator adjusting a step-down size of a threshold based on the determination of poor-quality frames.

Yet another aspect of the present invention encompasses a method for power control in a communication system, the method comprising the steps of receiving at a first base station, a first signal transmitted by a remote unit and receiving at a second base station a second signal transmitted by the remote unit. The signals are combined and a power of the remote unit is adjusted based on the combined signals.

Finally, another aspect of the present invention encompasses an apparatus for power control in a spread-spectrum communication system, the apparatus comprising a first base station, a second base station, a centralized base station controller (CBSC) coupled to the first and the second base station, which produces a combined signal, a soft-hand-off switch coupled to the first base station, the soft-hand-off switch receiving the combined signal and powering a remote unit based on the received combined signal.

Figure 1:
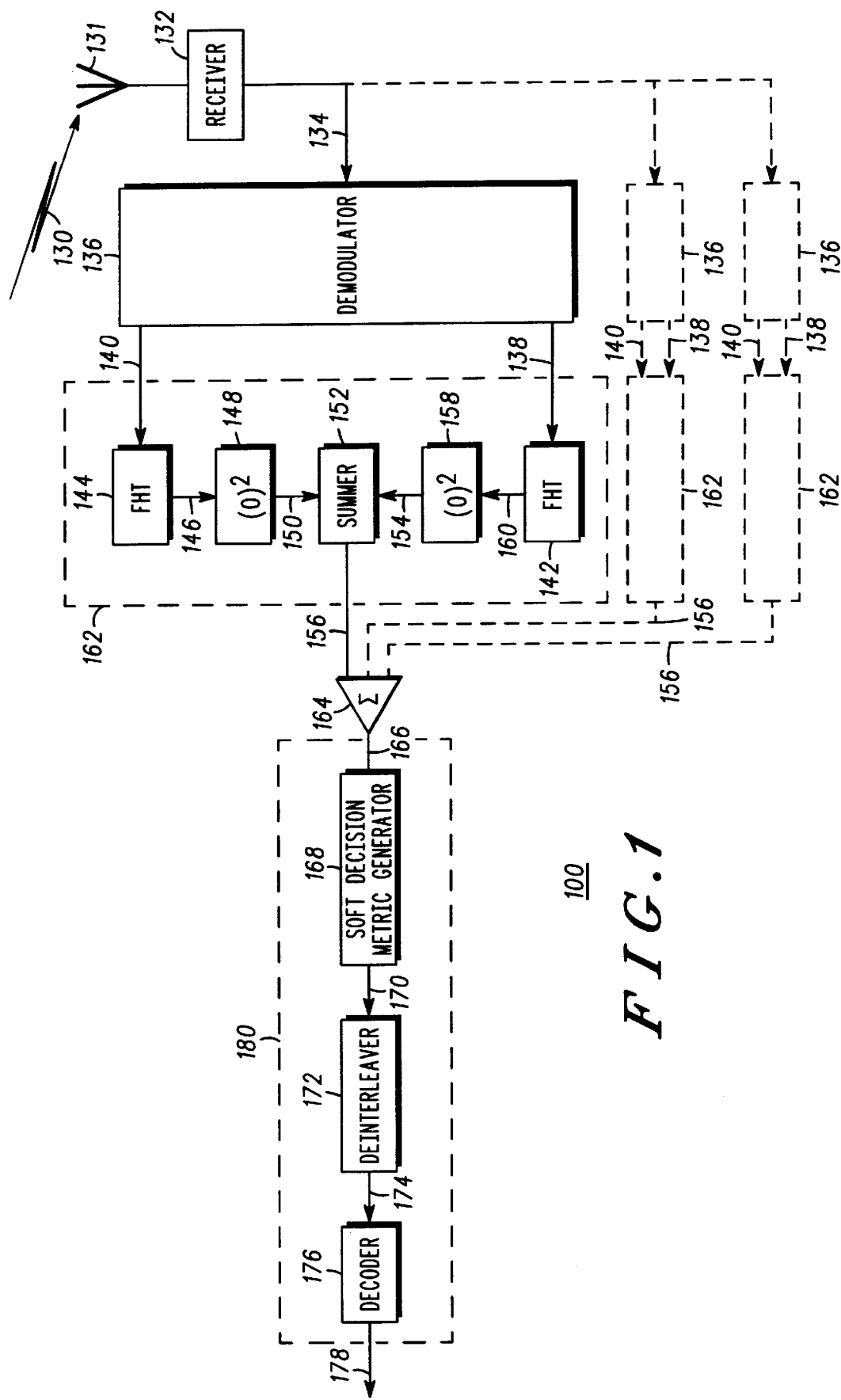
FIG. 1 is a block diagram of a preferred embodiment of a base station receiver that can utilize the present invention.

FIG. 1 is a block diagram of a preferred embodiment of a base station receiver 100 for receiving a power-control group transmitted by a remote unit. Orthogonally encoded spread-spectrum digital signal 130 is received at receive antenna 131 and amplified by receiver 132 before being despread and demodulated 136 into in-phase 140 and quadrature 138 components. Components 138, 140 of despread digital samples are then grouped into predetermined length groups (e.g., 64 sample length groups) of sampled signals that are independently input to orthogonal decoders in the form of fast Hadamard transformers 142, 144, which despread the orthogonally encoded signal components producing a plurality of despread signal components 146 and 160, respectively (e.g. when 64 sample length groups are input, then 64 despread signals are generated). In addition, each transformer output signal 146, 160 has an associated Walsh index symbol which identifies each particular orthogonal code from within a set of mutually orthogonal codes (e.g. when 64 sample length groups are input, then a 6 bit length index data symbol can be associated with the transformer output signal to indicate the particular 64 bit length orthogonal code to which the transformer output signal corresponds). The energy values with the same Walsh index in each group of resulting signal 156 from each branch of receiver 100 will then be summed at summer 164 to provide a group of summed energy values 166. The energy value with index i in the group of summed energy values 166 corresponds to a measure of confidence that the group of sampled signals, which generate this group of summed energy values 166, corresponds to the i-th Walsh symbol. The group of summed energy values with associated indices will then be sent to a soft decision metric generator 168 where a single metric for each encoded data bit is determined, thereby producing a single set of aggregate soft decision data 170. The aggregate soft decision data 170 is then deinterleaved by deinterleaver 172 prior to final maximum likelihood decoding by decoder 176.

Figure 2:
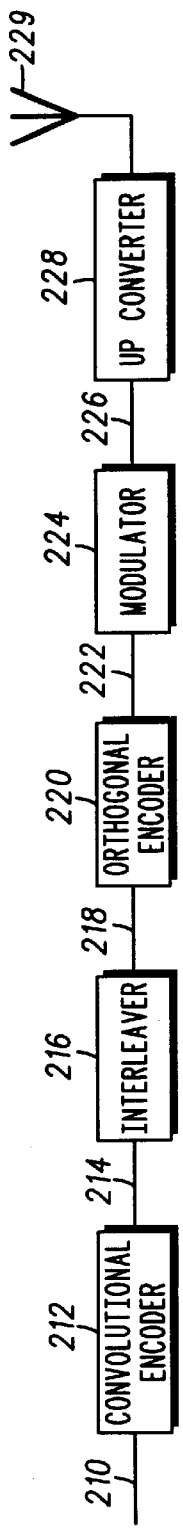
FIG. 2 is a block diagram of a preferred embodiment of a base station transmitter that can utilize the present invention.

FIG. 2 is a block diagram of a preferred embodiment of a CDMA transmitter 200 for transmitting a power-adjustment command to a remote unit. In a preferred embodiment the power-adjustment command is a power-control bit such that a "0" bit indicates to the remote unit to increase the mean output power level, and a "1" bit indicates to the remote unit to 1decrease the mean output power level. Transmitter 200 is preferably a transmitter such as that defined by TIA/EIA/IS-95A. Transmitter 200 includes convolutional encoder 212, interleaver 216, orthogonal encoder 220, modulator 224, upconverter 228, and antenna 229.

During operation, signal 210 (traffic channel data bits) is received by convolutional encoder 212 at a particular bit rate (e.g., 9.6 kbit/second). Input traffic channel data 210 bits typically include voice converted to data by a vocoder, pure data, or a combination of the two types of data. Convolutional encoder 212 encodes input data bits 210 into data symbols at a fixed encoding rate with an encoding algorithm which facilitates subsequent maximum likelihood decoding of the data symbols into data bits (e.g. convolutional or block coding algorithms). For example, convolutional encoder 212 encodes input data bits 210 (received at a rate of 9.6 kbit/second) at a fixed encoding rate of one data bit to two data symbols (i.e., rate ½) such that convolutional encoder 212 outputs data symbols 214 at a 19.2 ksymbol/second rate.

Data symbols 214 are then input into interleaver 216. Interleaver 216 interleaves the input data symbols 214 at the symbol level. In interleaver 216, data symbols 214 are individually input into a matrix which defines a predetermined size block of data symbols 214. Data symbols 214 are input into locations within the matrix so that the matrix is filled in a column by column manner. Data symbols 214 are individually output from locations within the matrix so that the matrix is emptied in a row by row manner. Typically, the matrix is a square matrix having a number of rows equal to the number of columns; however, other matrix forms can be chosen to increase the output interleaving distance between the consecutively input non-interleaved data symbols. Interleaved data symbols 218 are output by interleaver 216 at the same data symbol rate that they were input (e.g., 19.2 ksymbol/second). The predetermined size of the block of data symbols defined by the matrix is derived from the maximum number of data symbols which can be transmitted at a predetermined symbol rate within a predetermined length transmission block. For example, if the predetermined length of the transmission block is 20 milliseconds, then the predetermined size of the block of data symbols is 19.2 ksymbol/second times 20 milliseconds which equals 384 data symbols which defines a 16 by 24 matrix.

Interleaved data symbols 218 are input to orthogonal encoder 220. Orthogonal encoder 220 modulo 2 adds an orthogonal code (e.g., a 64-ary Walsh code) to each interleaved and scrambled data symbol 218. For example, in 64-ary orthogonal encoding, interleaved and scrambled data symbols 218 are each replaced by a 64 symbol orthogonal code or its inverse. These 64 orthogonal codes preferably correspond to Walsh codes from a 64 by 64 Hadamard matrix wherein a Walsh code is a single row or column of the matrix. Orthogonal encoder 220 repetitively outputs a Walsh code or its inverse 222 which corresponds to input data symbol 218 at a fixed symbol rate (e.g., 19.2 ksymbol/second).

The sequence of Walsh codes 222 is prepared for transmission over a communication channel by modulator 224. The spreading code is a user specific sequence of symbols or unique user code which is output at a fixed chip rate (e.g., 1.228 Mchip/second). In addition, the user code spread encoded chips are scrambled by a pair of short pseudorandom codes (i.e. short when compared to the long code) to generate an I-channel and Q-channel code spread sequence. The I-channel and Q-channel code spread sequences are used to bi-phase modulate a quadrature pair of sinusoids by driving the power level controls of the pair of sinusoids. The sinusoids output signals are summed, bandpass filtered, translated to an RF frequency, amplified, filtered via upconverter 228 and radiated by an antenna 229 to complete transmission of the channel data bits 210.

Figure 3:
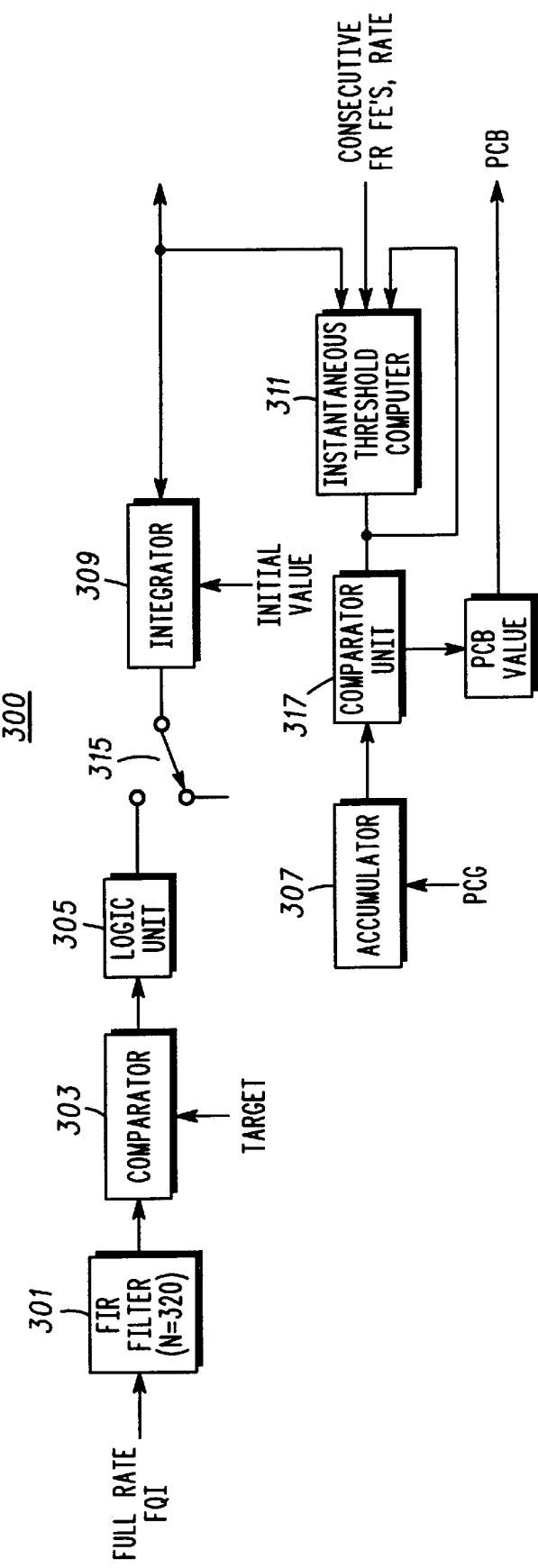
FIG. 3 illustrates an apparatus for controlling reverse channel power in accordance with a preferred embodiment of the present invention.

FIG. 3 illustrates apparatus 300 for controlling reverse channel power in accordance with a preferred embodiment of the present invention. Apparatus 300 comprises finite impulse response (FIR) filter 301, comparator 303, logic unit 305, switch 315, integrator 309, instantaneous threshold computer 311, accumulator 307, and comparison unit 317. Operation of apparatus 300 occurs as follows: Full rate frame quality information (FQI) enters FIR filter 301. FIR filter 301 uses a "first-in-first-out" buffer to store each of the N full-rate frame attributes, which, in a preferred embodiment includes frame quality information. In this embodiment, if frame rate information is indeterminable, rate information from the last rate determinable frame is used to determine if the current frame should be classified as a full rate frame or a sub rate frame. The "newest" full-rate frame's quality value that enters FIR filter 301 replaces the "oldest" full rate frame's quality value. In the preferred embodiment N=320. FIR filter 301 outputs a number of poor-quality frames existing within its buffer to comparator 303. Comparator 303 compares the number of poor-quality frames existing within FIR filter 301 to a target value. The target value is determined from the desired operational FER. The relationship between the number of frames existing within FIR filter 301 and the FER value is:

FER=(number of poor-quality frames in buffer)/(buffer size).

Thus the target number of frames for a target FER is simply:

(buffer size)*(target FER)=(target value).

Continuing, the difference between the target value and the current number of poor-quality frames existing within FIR filter 301 is output from comparator 303, and input into logic unit 305. Logic unit 305 determines a value (1, 0, or −1 in the preferred embodiment) to set the step-down size adjustment which is used to modify the step-down size of the threshold value. This is done by setting the step-down size adjustment to "1" if the target value is greater than the current number of poor-quality frames existing within FIR filter 301 and, to "−1" if the target value is less than the current number of poor-quality frames. If the difference between the target value and the current number of poor-quality frames existing within FIR filter 301 is zero, then the step-down adjustment size is set to zero. The step-down size adjustment is output from logic unit 305 and enters switch 315.

Switch 315 typically has a zero value as an input, but opens to receive the step-down size adjustment once for every "n" step-down size adjustments sent to it. In a preferred embodiment "n"=75. Switch 315 then outputs its input value to integrator 309. Simply put, operation of switch 315 serves to pass a zero value to integrator 309 74 times for every 75 step-down size adjustments sent to it, and only passes the stepdown size adjustment once out of every 75 times a step-down size adjustment is sent to it. Integrator 309 adjusts the step-down size and outputs the adjusted step-down size to instantaneous threshold computer 311.

Continuing, the winning Walsh symbol energy for n1 Walsh symbol intervals for a power-control group transmitted from the remote unit is input into accumulator 307. (In a preferred embodiment n1=6). Accumulator 307 calculates the energy of the remote unit and outputs this value to comparison unit 317. Frame erasure information is input into instantaneous threshold computer 311. Instantaneous threshold computer 311 adjusts the threshold value based on the frame quality information utilizing the current step-down and step up values, and outputs the threshold value to comparison unit 317. Comparison unit 317 compares the power control group (output from the winning Walsh symbol accumulator 307) to the threshold value (output from instantaneous threshold computer 305) and determines a power-control bit value based on the comparison. The power-control bit value is then output from comparison unit and transmitted to the remote unit, instructing the remote unit to power up or down accordingly. By dynamically adjusting the step-down size the threshold more quickly approaches the optimal operation threshold.

Figure 4:
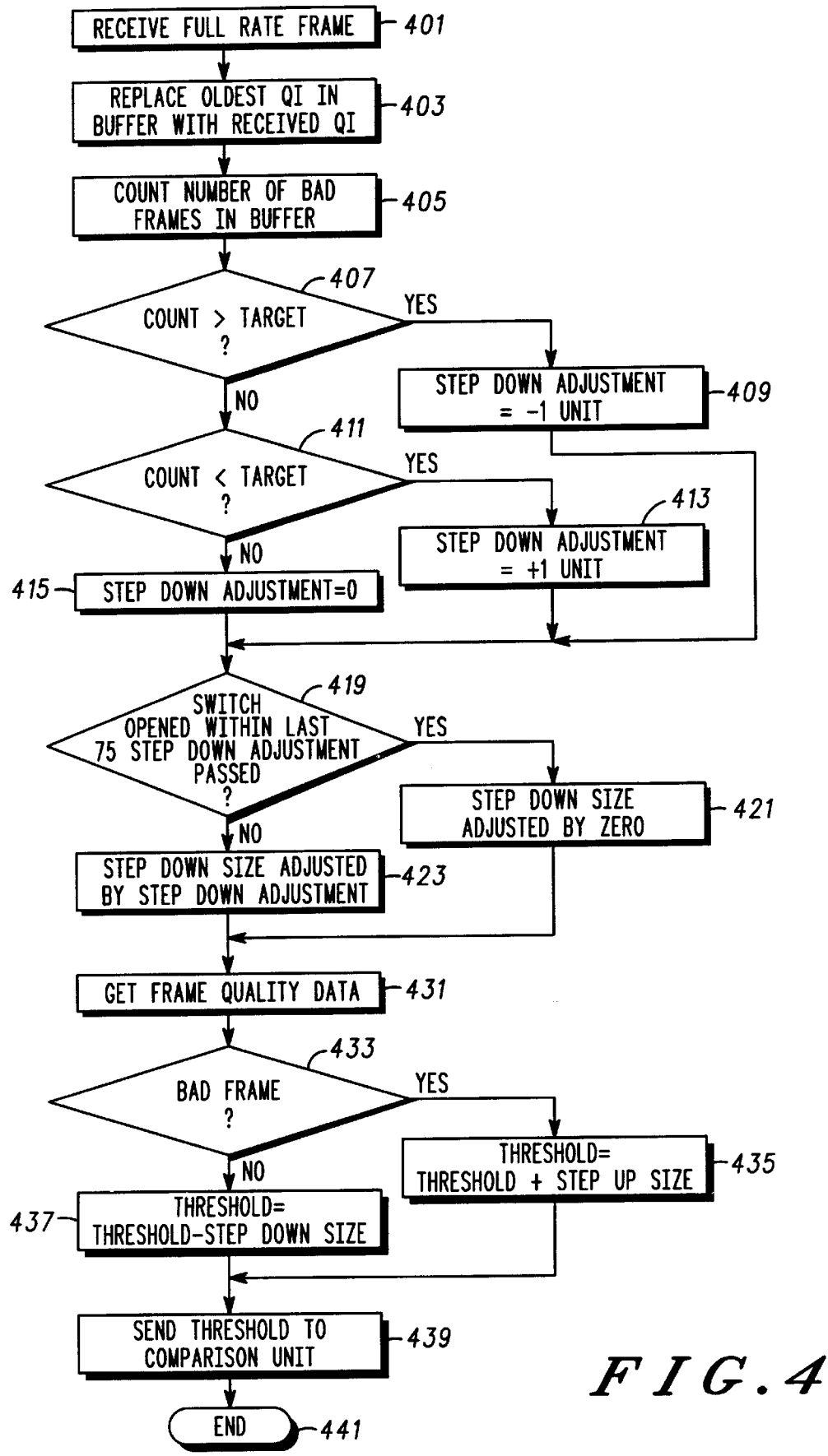
FIG. 4 illustrates a flow chart for controlling reverse channel power in accordance with a preferred embodiment of the present invention.

FIG. 4 illustrates a flow chart for controlling reverse channel power in accordance with a preferred embodiment of the present invention. The logic flow begins at step 401 where FIR filter 301 receives a full-rate frame. Next, at step 403, FIR filter 301 replaces the oldest frame's quality information existing within its buffer with the received frame's quality information, and (at step 405) determines the number of poor-quality frames existing within its buffer. At step 407, comparator 303 compares the number of poor-quality frames existing within FIR filter 301 to a target value. If at step 407 comparator 303 determines that the number of poor-quality frames is greater than the target value, then (at step 409) the step-down adjustment set to −1 unit and the logic flow continues to step 419. If at step 407 comparator 303 determines that the number of poor-quality frames is not greater than the target value then the logic flow continues to step 411 where comparator 303 determines if the number of poor-quality frames existing within FIR filter 301 is less than the target value, and if so the step-down adjustment set to +1 unit (at step 413) and the logic flow continues to step 419. If at step 411 it is determined that the number of poor-quality frames within FIR filter 301 is not less than the target value, then the logic flow continues to step 415 where the step-down adjustment is set to zero.

At step 419, switch 315 checks to see if it has opened (passed a step-down size adjustment) within the last 75 step-down adjustments sent to it. If switch 315 has opened within the last 75 step-down adjustments sent to it, then at step 421, the step-down size is adjusted by zero and the logic flow continues to step 431, otherwise the step-down size is adjusted by the step-down adjustment (step 423) and the logic flow continues to step 431. At step 431, instantaneous threshold computer 311 obtains frame quality data and determines (step 433) if a frame is bad. If, at step 433, instantaneous threshold computer 311 receives a bad full-rate frame, then the current threshold is adjusted by a step up size and the logic flow continues to step 439, otherwise the threshold is adjusted down by the step-down size and the logic flow continues to step 439. At step 439, instantaneous threshold computer 311 passes the current threshold to comparison unit 203, and the logic flow ends at step 441.

Figure 5:
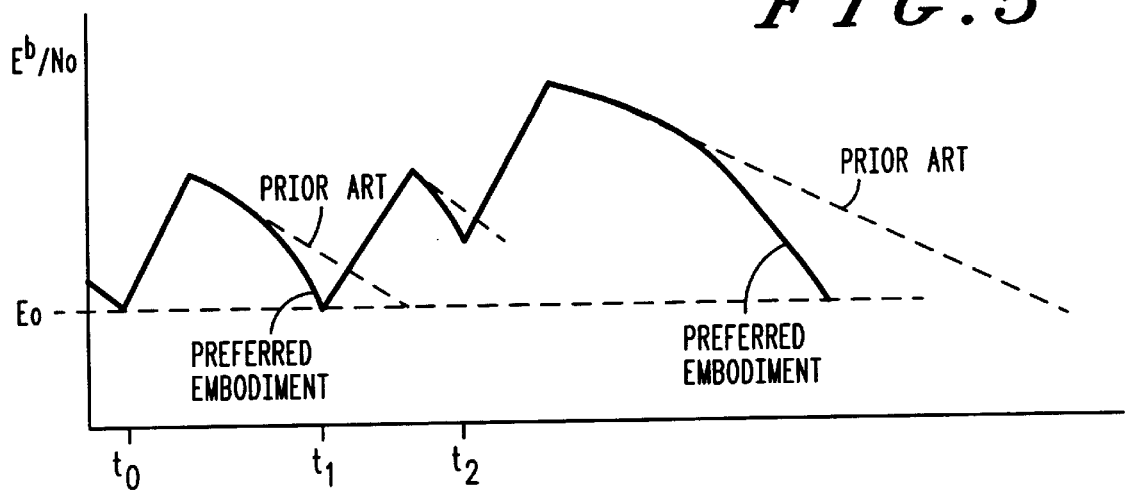
FIG. 5 illustrates a time-domain diagram of instantaneous threshold values in accordance with a preferred embodiment of the invention.

FIG. 5 illustrates a time-domain diagram of instantaneous threshold values in accordance with a preferred embodiment of the invention. In FIG. 5 Eo represents the threshold at which frame erasures are highly likely to occur. The optimal operation threshold is slightly 1greater than $E_o$, since a threshold energy at $E_o$ will likely result in frame erasures. At time $t_o$ the threshold energy has dropped to $E_o$ and a frame erasure was detected by the base station. The base station immediately increases the energy of the threshold and begins a slow decay that is dynamically adjusted as discussed above. At time $t_1$ the threshold energy again resumes to $E_o$ and another frame erasure occurs, increasing the threshold level. During the decay of the threshold level (prior to reaching $E_o$) another frame erasure (at time $t_2$) is detected by the base station and the threshold level is again increased. As is evident in FIG. 5, the decay time to reach the desired energy is reduced substantially over the prior-art method (dotted lines).

Figure 6:
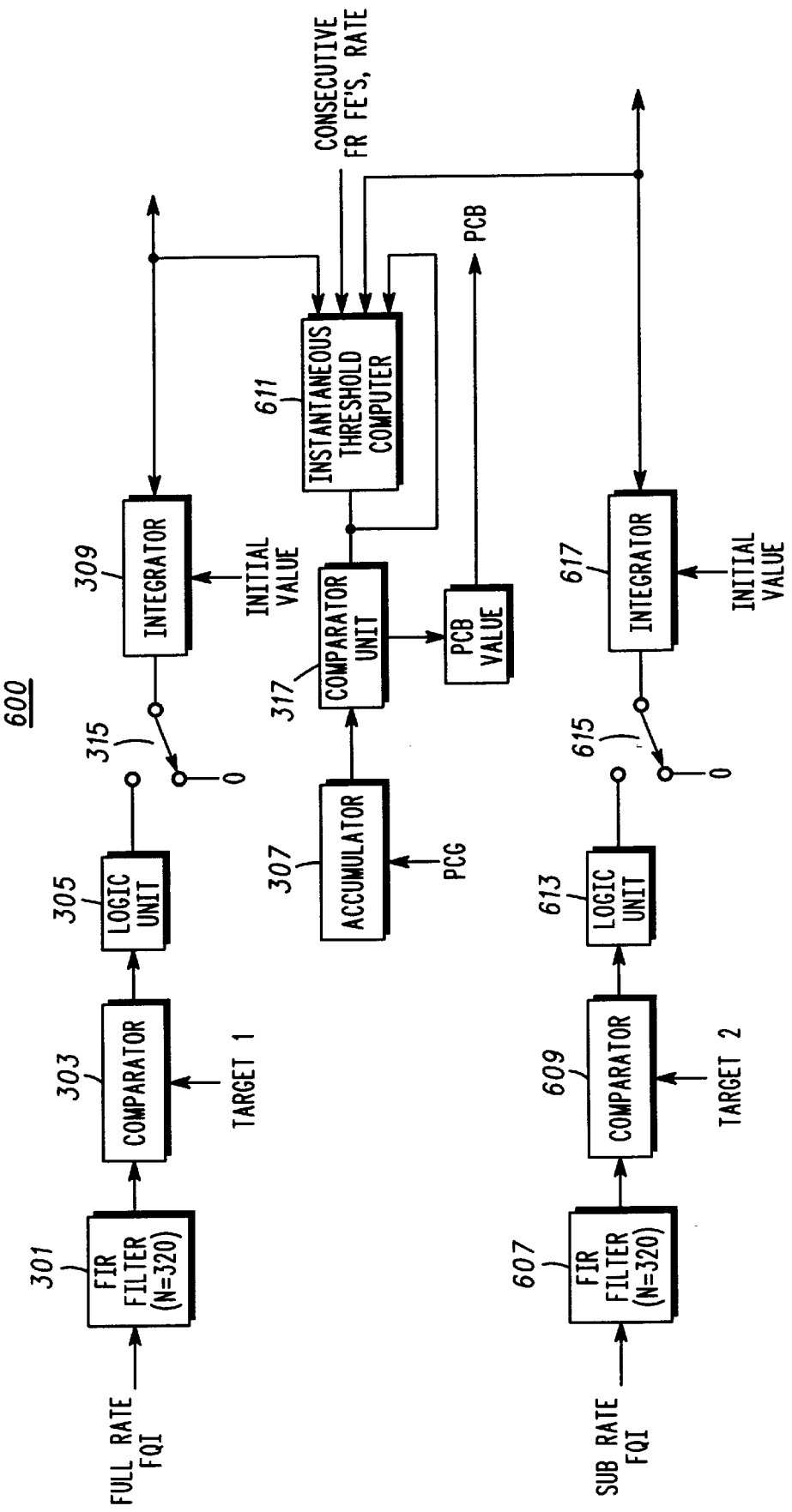
FIG. 6 illustrates an apparatus for controlling reverse channel power in accordance with an alternate embodiment of the present invention.

In many cases it is desirable to have differing target values within FIR filter 301 depending upon whether acquisition by FIR filter 301 takes place at a full rate or a subrate. FIG. 6 illustrates an apparatus 600 for controlling reverse channel power in accordance with an alternate embodiment of the present invention. This embodiment utilizes a second input into instantaneous threshold computer 611 for a subrate leg. Apparatus 600 comprises first FIR filter 301, second FIR filter 607, first comparator 303, second comparator 609, first logic unit 305, second logic unit 613, first switch 315, second switch 615, first integrator 309, second integrator 617, instantaneous threshold computer 611, accumulator 307, and comparison unit 317. Operation of apparatus 600 occurs as follows: Full rate frame quality information enters FIR filter 301 and subrate frame quality information enters FIR filter 607. FIR filters 301 or 607 use a "first-in-first-out" buffer to store the quality information of N frames, which, in a preferred embodiment includes frame quality information. Frame quality information that enters FIR filters 301 or 607 replaces the "oldest" frame's quality information in FIR filter 301 or 607. In the preferred embodiment N=320. The FIR filters 301 or 607 output a number of poor-quality frames existing within their buffers to first comparator 303 and second comparator 609 respectively. Comparators 303 and 609 compare the number of poor-quality frames existing within FIR filters 301 or 607 to a target value. In the alternate embodiment the target value for full-rate FIR filter 301 differs from that of subrate FIR filter 607 since it may be desirable to increase the frame erasure rate (FER) target value for subrate FIR filter 607.

Continuing, the difference between the target values and the current number of poor-quality frames existing within FIR filters 301 or 607 is output from comparators 303 and 609 and input into logic unit 305 and logic unit 613 respectively. Logic units 305 and 613 determine a value (1, 0, or −1 in the preferred embodiment) to set the step-down size adjustment which is used to modify the step-down size of the threshold value. This is done by setting the step-down size adjustment to +1 or −1 if the difference between the target value and the current number of poor-quality frames existing within FIR filters 301 or 607 is less than, or greater than (respectively) the target value existing within respective FIR filters 301 or 607. If the difference between the target value and the current number of poor-quality frames existing within FIR filters 301 or 607 is zero, then the step-down adjustment size is set to zero. The step-down adjustments are output from logic units 305 and 613 and enters first switch 315 and second switch 615 respectively.

Switches 315 and 615 typically have a zero value as an input, but open to receive a step-down size adjustment once for every "n" step-down adjustments sent to them. In a preferred embodiment "n"=75. Switches 315 and 615 then output their input values to integrator 309 and integrator 617 respectively. Integrators 309 and 617 adjust the step-down size by the value (0, +1, or −1) and output the adjusted step-down size to instantaneous threshold computer 311.

Continuing, a Walsh symbol energy transmitted from the remote unit is input into accumulator 307. Accumulator 307 calculates the energy of the remote unit and outputs this value to comparison unit 317. Frame erasure and rate information are input into instantaneous threshold computer 611. Instantaneous threshold computer 611 determines if the system is currently receiving full or subrate frames and chooses the corresponding full rate or sub-rate step-down size. Instantaneous threshold computer then adjusts the threshold value based on the frame erasure information utilizing the current step-down and step up values, and outputs the threshold value to comparison unit 317. Comparison unit 317 compares the energy of the remote unit (output from accumulator 307) to the threshold value (output from instantaneous threshold computer 305) and determines a power-control bit value based on the comparison. The power-control bit value is then output from comparison unit and transmitted to the remote unit, instructing the remote unit to power up or down accordingly. By dynamically adjusting the step-down size the threshold more quickly approaches the optimal operation threshold. Additionally, the prior-art method of power control has a decay time that is prolonged by the fact that the threshold cannot be reduced during subrate frames since this may result in one or more consecutive bad full rate frames upon resumption of their (the full rate frames) transmission by the mobile. That is, if allowed, the threshold could be reduced to such a level during subrate frame transmission that when full rate transmission was resumed one or more full rate frames could be received with insufficient quality (bad full rate frames) because the mobile transmit power was correspondingly allowed to drop to too low a level. An additional advantage over both the prior art and the previous adaptive step-down size approach based only on full rate frame information is that the threshold can be allowed to decay even during subrate frames because of the setting of the subrate poor-quality rate via controlling the threshold levels that correspond to the desired full rate poor-quality rate. Again, this is possible because subrate frame quality information is used to control the threshold level during subrate frame transmission.

Figure 7:
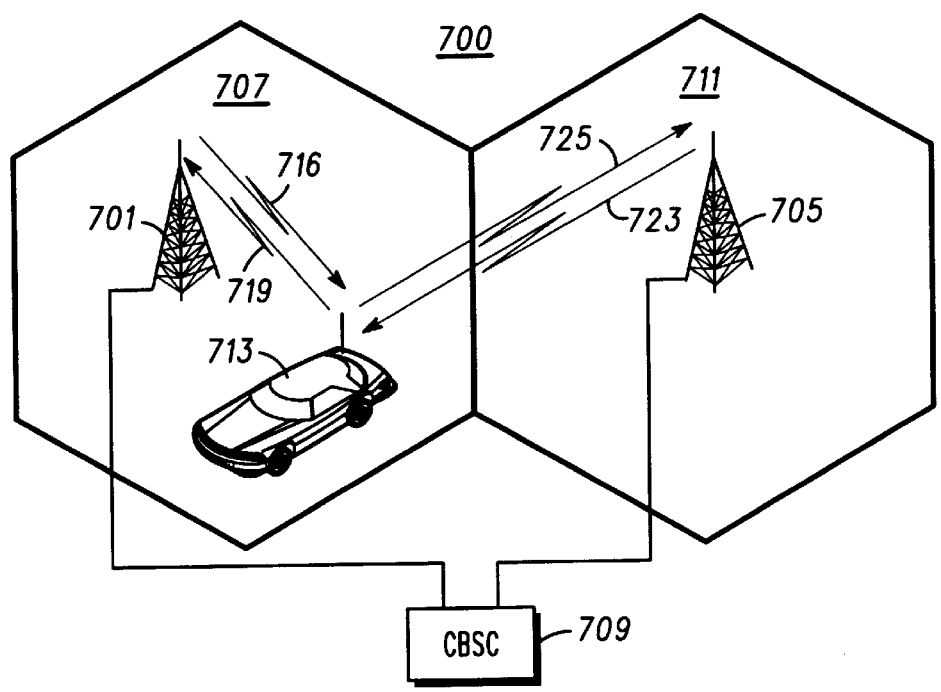
FIG. 7 illustrates a communication system in accordance with a preferred embodiment of the present invention.

FIG. 7 illustrates a communication system 700 in accordance with a preferred embodiment of the present invention. The communication system 700 includes base stations 701 and 705 having respective service coverage areas 707 and 711 respectively, centralized base station controller (CBSC) 709, and communication unit 713. Apparatus 600 (see FIG. 6) for controlling reverse channel power is incorporated in base stations 701, 705 and CBSC 709. As shown, communication unit 713 is communicating with serving base station 701 via uplink communication signal 719 and serving base station 701 is communicating with communication unit 713 via downlink communication signal 716. Similarly, communication unit 713 is communicating with base station 705 via uplink communication signal 725 and base station 705 is communicating with communication unit 713 via downlink communication signal 723. CBSC 709 is suitably coupled to both serving base station 701 and base station 705.

During soft hand-off (SHO) (communication unit 713 communicating to both base station 701 and base station 705) the CBSC 709 receives remote unit's communication via both uplink communication signal 719 and uplink communication signal 725. The CBSC 709 then performs a selection function to choose the best quality frame based on quality and rate information also included in the uplink transmission. It can be shown that because of the post-selection diversity benefit, the FER of communication unit 713 at the CBSC 709 ($FER_{CBSC}$) is approximately upper bounded by the product of communication unit's 713 FER at serving base station 701 ($FER_1$) with communication unit's 713 FER at base station 705 ($FER_2$). In other words:

$FER_{CBSC} \leq FER_1 * FER_2$.

During SHO with two base stations, with no transmission gain imbalance between the communication legs, the FER at the CBSC 709 may be less than 0.01% while the FER at the best serving base station participating in the SHO (as many as 6 base stations may participate in IS-95A DS-CDMA) may be at 1.0%. The post-selection diversity benefit is mitigated as the transmissions gain imbalance increases. In IS-95A DS-CDMA the mobile receives independent power control commands from each SHO link in the form of a power control bit which punctures existing symbols every 1.25 ms on the forward link of each BTS. The mobile uses a voting technique to choose whether to power up or down by 1 dB based on these PCBs. If both PCBs indicate a power increase then the mobile will increase its transmit power by 1 dB, else it will decrease its transmit power by 1 dB. It can be shown because of an interaction between voting and the target thresholds at each BTS that the individual legs frame quality level (e.g. FER is used in the preferred embodiment) will degrade to be greater than the desired target quality value (e.g. 1.0% FER) while the quality level after the selector will still be generally better than the desired target quality level. Therefore, there is some post-selection diversity benefit left can be taken advantage of in order to reduce mobile transmit power even more which will decrease interference and hence increase the capacity of the communications system as a whole while still maintaining a desired target quality level for the mobile in soft hand-off.

Figure 8:
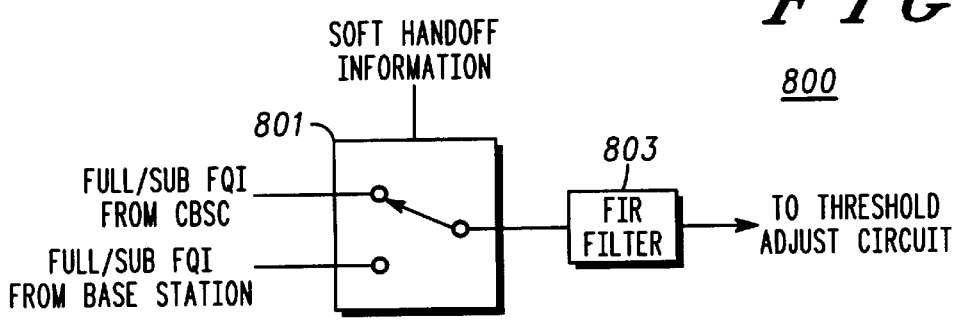
FIG. 8 illustrates an apparatus for controlling reverse channel power during soft-hand-off in accordance with a preferred embodiment of the present invention.

FIG. 8 illustrates an apparatus 800 for controlling reverse channel power during soft-hand-off in accordance with a preferred embodiment of the present invention. Apparatus 800 comprises SHO switch 801 and FIR filter 803. FIR filter 803 can be any of the previously discussed FIR filters (FIR filters 301 or 607 for example). Operation of apparatus 800 occurs as follows: SHO switch 801 has as an input, full and sub-rate frame quality information received by CBSC 709. The full and sub-rate frame quality information for the best quality frame is determined by the selection function at the CBSC 709. In the case that the rate of a frame is not determinable the rate of the last rate determinable frame will be used instead. This applies at the CBSC 709 as well as at the serving base stations. Additionally, SHO switch 801 has as an input, full and sub-rate frame quality information received by the serving base station 701. Information regarding whether the remote unit 713 is in a SHO state is also input into SHO switch 801. During normal operation (when the mobile is not in SHO), SHO switch 801 receives full/sub-rate frame quality information from the serving base station 701. Once the remote unit 713 enters a SHO state, SHO switch 801 receives post-selection full/sub-rate frame quality information from CBSC 709. The utilization of the CBSC's 709 frame quality information in the FIR filters in place of the serving base station's 701 frame quality information will generally result in larger step down sizes until the desired FER target is achieved. That is, the step down size will be increased until the frame quality level at the CBSC 709 degrades to the desired target quality level. In other words, remote unit 713 is capable of reducing transmit power and still achieve a 1% FER at the CBSC 709. Note that since the base stations all use the same algorithm and reset to a pre-determined step down size when entering a increased soft hand-off state they always have the same step down size.

An alternate embodiment is to compute the post-selection quality at each individual serving base station 701 during soft hand-off from the post-selector frame quality and rate information passed down by the CBSC 709 by using the FIR filter method described above. If the derived CBSC frame quality is better than the desired quality target then the quality target for each base station apparatus is relaxed by a fixed amount (in this embodiment the quality target is the FE target and it is increased by 1) every n frames (in this embodiment n=75). ). Similarly, as the CBSC frame quality falls below the desired quality target the FE target would be decreased by 1 every n frames. Since the serving base stations all use the same algorithm they could reset to a pre-determined quality target and step down size when adding a soft hand-off link such that each serving base station would always have the same FE target and step down size. When the remote unit 713 leaves soft hand-off (only one base station) the remaining base station quality target is reset to the desired quality target.

Another embodiment takes advantage of the post-selection diversity benefit by reducing the maximum allowed downlink threshold level instead of varying the step down size until the post-selector quality level is achieved at the CBSC 709. If the derived CBSC frame quality is better than the desired quality target then the maximum allowed downlink threshold level for each base station apparatus is relaxed by a fixed amount (in this embodiment the preferred amount is 0.25 dB) every n frames (in this embodiment n is 75 also). Similarly, as the CBSC frame quality falls below the desired quality target the maximum allowed downlink threshold level would be increased (similarly by 0.25 dB). Since the serving base stations all use the same algorithm the maximum downlink threshold could be set to a pre-determined level when adding a soft hand-off link such that each serving base station would always have the same maximum downlink threshold level. When the remote unit 713 leaves soft hand-off (only one base station) the remaining base station maximum downlink threshold level is reset to the desired quality target.

The invention, in its broader aspects, is not limited to the specific details, representative apparatus, and illustrative examples shown and described above. Various modifications and variations can be made to the above specification without departing from the scope or spirit of the present invention. For example although the above description describes power control within a spread-spectrum system this method of power control can be employed within any communication system (Personal Communication Systems for example). It is intended that the present invention cover all such modifications and variations provided they come within the scope of the following claims and their equivalents.

What is claimed is:

1. A method for power control in a communication system, the method comprising the steps of:

receiving at a first base station, a first signal transmitted by a remote unit;

receiving at a second base station a second signal transmitted by the remote unit;

combining the first and the second signals to produce combined signals; and adjusting a power of the remote unit based on the combined signals, wherein the step of adjusting the power of the remote unit comprises the steps of utilizing a best quality frame information received from one of the first and the second base stations transmitting the best quality frame information to the first and second base station to produce a transmitted best quality frame information, and adjusting a power of the remote unit based on the transmitted best quality frame information.

2. The method of claim 1 wherein the communication system comprises a code-division, multiple-access communication system.

3. The method of claim 1 further comprising the steps of:

receiving by the first base station the best quality frame information to produce a received best quality frame information;

storing the received best quality frame information in a filter; and determining an amount of poor-quality frames existing within the filter.

* * * * *